United States Patent [19]

Clark

[11] Patent Number: 4,478,137
[45] Date of Patent: Oct. 23, 1984

[54] HYDRAULIC BRAKE ACTUATOR

[75] Inventor: James R. Clark, Milford, Mich.

[73] Assignee: Rockwell International Corporation, Pittsburgh, Pa.

[21] Appl. No.: 457,824

[22] Filed: Jan. 13, 1983

[51] Int. Cl.³ .............................. F01B 7/20; F16J 15/18
[52] U.S. Cl. .......................................... 92/63; 92/129; 92/130 A; 92/167; 92/168; 91/173; 277/30; 277/58; 277/189
[58] Field of Search ............... 92/167, 63, 129, 130 A, 92/168; 188/343; 74/110; 91/173; 277/30, 58, 173, 189, 205

[56] References Cited

U.S. PATENT DOCUMENTS

| | | | |
|---|---|---|---|
| 2,794,633 | 6/1957 | Delaney | 91/173 |
| 3,926,094 | 12/1975 | Kurichh et al. | 92/167 |
| 4,211,150 | 7/1980 | Framberg | 92/167 |
| 4,251,050 | 2/1981 | McInerney | 92/167 |

FOREIGN PATENT DOCUMENTS

| | | | |
|---|---|---|---|
| 2228394 | 11/1974 | France | 188/343 |
| 146467 | 8/1961 | U.S.S.R. | 91/173 |

*Primary Examiner*—Paul E. Maslousky

[57] ABSTRACT

A hydraulic brake actuator for a wedge type brake includes a tubular structure extending from the brake and housing an extended end of a stem of the wedge of the brake therein. A primary cylinder is mounted on the tubular structure and includes a primary piston mounted for sealed movement therein. The piston has a rod extending from one side thereof into the tubular structure to be operably connected to the extended end of the stem. A spring acts on a second side of the piston and is capable of moving the piston toward a first position within the cylinder for actuation of the brake. Hydraulic fluid can be selectively introduced to the primary cylinder at the first side of the piston to cause movement thereof in opposition to the spring to a second position to prevent actuation of the brake by the spring. An annular space between an interior surface of the tubular structure and an exterior surface of the rod is sealed to prevent the hydraulic fluid from escaping from the cylinder. The sealing includes a floating seal carrier surrounding the rod and supporting a seal which extends inwardly to make sealing contact with the exterior of the rod and a mechanical face seal at the end of the floating seal carrier to prevent the escape of hydraulic fluid behind the floating seal carrier.

7 Claims, 1 Drawing Figure

HYDRAULIC BRAKE ACTUATOR

BACKGROUND OF THE INVENTION

1. Field of the Invention.

This invention relates to a hydraulic brake actuator for a wedge type brake and, more specifically, to such a brake actuator which utilizes an actuation rod and an improved sealing configuraiton to prevent the escape of hydraulic fluid around the actuation rod.

2. Description of the Prior Art.

There has heretofore been provided a number of emergency and service hydraulic brake actuators such as those disclosed in U.S. Pat. Nos. 3,232,175, 3,292,423, 3,462,986; and No. Reissue 26,432. These actuators all include an emergency brake actuation member which is mounted on a tubular structure which extends from the brake and houses an extended end of the stem of the wedge of the brake therein. A primary cylinder of the emergency actuation member is mounted on the tubular structure and includes a primary piston mounted for sealed movement within the primary cylinder. The primary piston includes a rod which extends from the first side of the piston into the tubular structure to be operably connected to the extended end of the stem. A spring acts on the second side of the primary piston and tends to produce emergency actuation of the brake if it is not opposed by primary hydraulic fluid introduced to the primary cylinder at the first side of the primary piston.

In these combined emergency and service hydraulic brake actuators, the operable connection between the emergency actuation member and the wedge of the brake included a means for introducing service hydraulic fluid into the interior of the tubular structure. The service hydraulic fluid would act on the end of the rod and on the end of a stem of the wedge to selectively increase the relative distance therebetween during service actuation of the brake. This configuration required that the tubular structure be designed to withstand service hydraulic fluid pressure and that there be sealing provided to prevent the escape of the service hydraulic fluid into the emergency actuation member or the brake. Specifically, in order to separate the interior of the primary cylinder and the interior of the tubular structure, the rod from the primary piston was required to extend through a common wall therebetween and to be sealed to prevent the passage of hydraulic fluid from either interior into the other. In these prior art devices, the sealing around the rod was provided by one or more O-rings. However, it has been found that the O-ring seals in these and similar actuator configurations have not always had the desired life expectancy needed for safe and reliable brake operation. Whether the decreased effectiveness of such seals is due to an inability to maintain proper tolerances for such an installation, the wear of such O-rings due to repeated axial movement of the primary piston rod, or other factors affecting the wear of the O-rings such as the requirement that opposite sides of the O-rings are subjected to different hydraulic fluid pressure levels is not fully known and might vary from configuration to configuration.

It should be noted that a similar sealing problem could exist in certain emergency actuators which are not used in conjunction with the type of service actuation means as found in the above-mentioned patents. A spring-applied, hydraulic-released actuator could be employed in a wedge type brake for emergency braking without there being provided a service actuator therebetween for service braking. Service braking could be separately provided within the brake without employing the wedge itself. However, there would still be a need to insure that there is adequate sealing around the actuation rod to prevent primary hydraulic fluid from escaping into the tubular structure even though the tubular structure would not be designed to withstand or include any service hydraulic fluid.

One prior art emergency actuator without a combined service feature has also used O-ring seals around the actuation rod. However, the primary piston rod does not extend through a wall at the end of the primary cylinder which was integrally formed with the primary cylinder as was the common wall in each of the actuators disclosed in the patents mentioned above. Instead, an annular seal carrier is mounted around the rod to prevent the escape of hydraulic fluid from the primary cylinder through an annular space between an interior surface of the tubular structure and the exterior surface of the rod. Specifically, the annular seal carrier has a circumferential groove and O-ring configuration about its exterior surface to seal against the interior surface of the tubular structure and a circumferential groove and O-ring configuration about its interior surface to seal against the exterior surface of the actuation rod.

It is expected that such an O-ring configuration could have the same life expectancy problems as the O-ring configurations shown for the integral common wall of the actuator in the patents mentioned above. However, the use of a separate sealing carrier might simplify assembly and be otherwise attractive since the grooves would be easier to form and the O-rings easier to install on a carrier than they could within the integral wall of the larger primary cylinder. On the other hand, the use of a separate sealing carrier does increase the number of components which require finer manufacturing tolerances to insure an effective seal. With the integral wall and only one O-ring, the tolerances of the interior surface of the wall opening, the base of the groove, and the exterior surface of the rod are critical to insure adequate sealing. With the separate annular seal carrier with one O-ring at its exterior surface and one O-ring at its interior surface, the tolerances of the interior surface of the tubular structure, the exterior surface of the carrier, the base of the groove at the exterior surface, the interior surface of the carrier, the base of the groove at the interior surface, and the exterior surface of the rod are all critical. Of course, if an additional O-ring is desired between any of the interior and exterior surfaces, the base of the particular groove needed for the additional O-ring must also be provided the desired tolerances.

Each component requiring finer tolerances adds to the overall cost of providing an effective actuator and any failure to provide the necessary tolerances for any one component reduces the likelihood of effective sealing for the actuator.

SUMMARY OF THE INVENTION

It is therefor an object of the invention to provide a hydraulic brake actuator for a wedge type brake which is reliable and relatively simple to provide.

It is another object of the invention to provide such an actuator which includes effective hydraulic fluid sealing about the actuation rod while utilizing a minimum number of components requiring critical manufacturing tolerances.

These and other objects of invention are provided in a preferred embodiment in the form of a hydraulic brake actuator for a wedge type brake which includes a tubular structure extending from the brake and housing an extended end of a stem of the wedge of the brake therein. A primary cylinder is mounted on the tubular structure. A primary piston is mounted for sealed movement within the primary cylinder and has rod means extending from a first side thereof into the tubular structure to be operably connected to the extended end of the stem. Biasing means acts on a second side of the primary piston and is capable of moving the primary piston toward a first position within the primary cylinder for actuation of the brake. There is included means for selectively introducing primary hydraulic fluid to the primary cylinder at the first side of the primary piston to cause movement thereof in opposition to be biasing means to a second position within the primary cylinder to prevent the actuation of the brake by the biasing means. There is also included means for preventing a loss of the primary hydraulic fluid from the primary cylinder through an annular space between an interior surface of the tubular structure and an exterior surface of the rod means. The means for preventing the loss of primary hydraulic fluid includes a floating seal carrier surrounding the rod means and supporting sealing means extending inwardly to make sealing contact with the exterior surface of the rod means and means for preventing the passage of primary hydraulic fluid between the floating seal carrier and the interior surface of the tubular structure.

DETAILED DESCRIPTION OF THE PREFERRED EMBODIMENT

Figure 1:
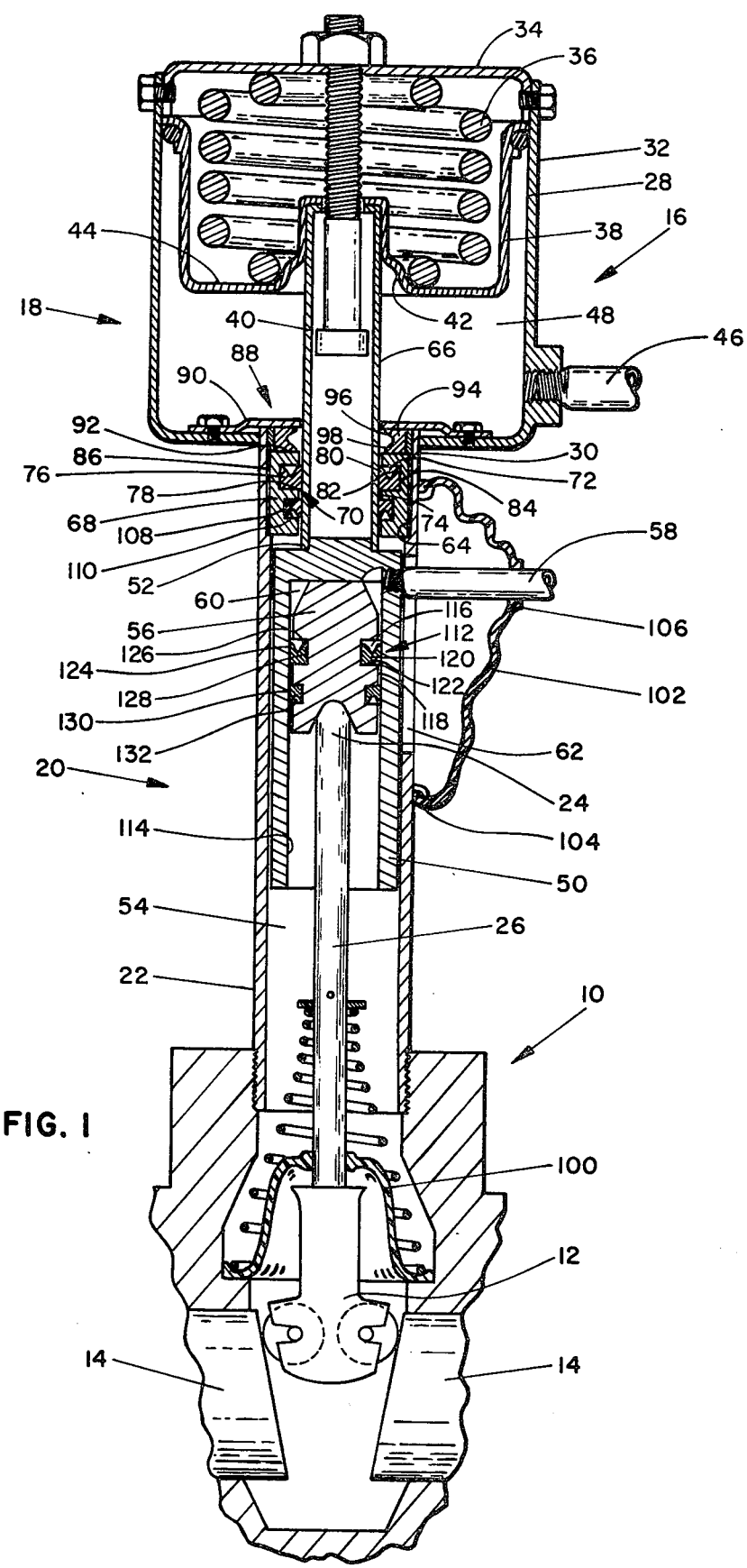
FIG. 1 is a sectional, elevated view of the preferred emergency and service hydraulic brake actuator for a wedge type brake including various features of the invention.

As seen in FIG. 1, a typical wedge type brake 10 includes a wedge 12 which is shown in a position prior to any actuation of the brake. When the brake 10 is actuated by an emergency or service actuation means, the wedge 12 will be caused to move downwardly to act on a pair of plungers 14 to cause their outward movement. The plungers 14 would in turn act on the brake shoes (not shown) to bring them into frictional contact with a rotating brake drum (not shown) to produce frictional braking forces therebetween.

Actuation of the wedge 12 is provided in the preferred improved emergency and service brake actuator 16 by an emergency actuation means 18 or a service actuation means 20. Specifically, a tubular structure 22 extends from the brake 10 to house an extended end 24 of a stem 26 of the wedge 12 therein. The preferred emergency actuation means 18 includes an emergency or primary cylinder 28 mounted on the end 30 of the tubular structure 22. The primary cylinder 28 includes a cylindrical body portion 32 and an end plate 34 which is secured to the cylindrical body portion 32. The end plate 34 supports and the primary cylinder 28 houses a compressed spring 36 which is arranged to provide sufficient force to the wedge 12 to create a braking force on the brake shoes during emergency brake actuation.

However, the emergency actuation means 18 also includes an emergency or primary piston 38 which is mounted for sealed movement within the primary cylinder 28. A rod 40 is secured to and extends from a first side 42 of the primary piston 38 into the tubular structure 22 to be operably connected to the extended end 24 of the stem 26 in a manner which will be discussed herein below. Accordingly, the spring 36 acts as a biasing means to apply braking force to a second side 44 of the primary piston 38 and is capable, if unopposed, of moving the primary piston 38 from the position as shown in FIG. 1 to a lower position within the primary cylinder 28 to produce emergency actuation of the brake.

Of course, during normal operation of the vehicle, emergency brake actuation is not desired. Therefore, to oppose the force created by spring 36, there is provided a means for selectively introducing primary hydraulic fluid to the primary cylinder 28 at the first side 42 of the primary piston 38 to cause movement thereof in opposition to the spring 36. As seen in FIG. 1, primary hydraulic fluid has been supplied to the primary cylinder 28 to cause the piston 38 to be positioned as shown within the primary cylinder 28 to prevent actuation of the brake by the spring 36. A hydraulic line 46 is utilized to introduce the primary hydraulic fluid into the interior 48 of the primary cylinder 28 or to discharge primary hydraulic fluid from the interior 48 of the primary cylinder 28 to selectively cause movement of the piston 38 within the primary cylinder 28 in opposition to the spring 36 to prevent actuation of the brake or allow actuation of the brake by the spring 36. The fluid line 46 is preferably connected to a system such as those shown in the prior art patents mentioned hereinabove and thus includes a fail safe feature so that a loss of primary hydraulic fluid will evacuate the interior 48 of the primary cylinder 28 to allow actuation of the brake by the spring 36.

To provide the service actuation means 20, the preferred embodiment includes a service cylinder 50 which is mounted on an end 52 of the rod 40. It should be understood that this mounting need not be rigid since it might be desirable to allow some means for self-alignment therebetween. The service cylinder 50 is mounted within the interior 54 of the tubular structure 22 and is capable of being axially moved therein. Additionally, the service actuation means 20 includes a service piston 56 which is operably connected to the end 24 of the stem 26 and is mounted for sealed movement within the service cylinder 50. A hydraulic line 58 is included as a means for selectively introducing service hydraulic fluid to and discharging service hydraulic fluid from an interior 60 of the service cylinder 50. The service hydraulic fluid acts on the service piston 56 to produce relative movement between the cylinder 50 and the piston 56 when the emergency actuation means 18 is not being utilized and the rod 40 is in the position as shown in FIG. 1. The control of service hydraulic fluid into and out of line 58 is preferably provided by a system such as those shown in the prior art patents mentioned hereinabove. It might be desirable to include a means for preventing the introduction of service hydraulic fluid to the interior 60 of the service cylinder 50 if the emergency brake feature is being utilized and the spring 36 has caused a repositioning of the piston 38 toward the brake 10. However, there are some wedge type brakes which include members with sufficient strength and integrity to allow the emergency actuation means 18 to be energized to actuate the brake while still allowing service hydraulic fluid to be introduced to the interior 60 of the cylinder 50 without any damage to the brake. The additional force created by service actuation would create an additional but unnecessary braking force on the brake, but would not be harmful to the brake since it would not cause any damage thereto.

As mentioned hereinabove, the service cylinder 50 is mounted within the interior 54 of the tubular structure 22 and is capable of being axially moved therein. Therefore, when the emergency actuation means 18 is energized, movement of the end 52 of the rod 40 toward the brake 10 would cause corresponding movement of the service cylinder 50 and service piston 56 therein within the interior 54 of the tubular structure 22. To accomodate this movement, the tubular structure 22 is provided an axially extending, elongated slot 62 in a side thereof. With the hydraulic line 58 extending from the service cylinder 50 through the slot 62, the service cylinder 50 is capable of freely moving within the interior 54 of the tubular structure 22 in response to movement of the rod 40 with the emergency actuation means 18.

As thus explained, the preferred emergency and service brake actuator 16 includes major components which are arranged to provide the basic emergency and service actuation. However, there are a number of other features of the emergency and service actuator 16 which are preferable to insure that the actuator is reliable and relatively simple to provide.

For proper and safe operation of the emergency actuation means 18, it is essential to include a means for preventing the loss of primary hydraulic fluid from the primary cylinder 28 through an annular space between an interior surface 64 of the tubular structure 22 and an exterior surface 66 of the rod 40. In the preferred actuator 16, this is primarily accomplished by including a floating seal carrier 68 which surrounds the rod 40 and supports a sealing means 70 which extends inwardly to make sealing contact with the exterior surface 66. The sealing means 70 preferably includes a lip seal and is provided a circumferential groove 72 around an interior surface 74 of the carrier 68. The lip seal includes a U-shaped expandable seal 76 seated against an end wall 78 of the groove 72 remote from the primary piston 38. The expandable seal 76 has a first lip 80 which makes sliding, sealing contact with the exterior surface 66 of the rod 40 and a second lip 82 which makes sealing contact with a base 84 of the circumferential groove 72. The floating seal carrier 68 has an advantage of requiring a minumum number of manufacturing tolerances to effectively provide sealing around the exterior surface 66 of the rod 40.

Specifically, the more critical manufacturing tolerances need only be provided to the exterior surface 66 of the rod 40, the interior surface 74 of the carrier 68, and the base 84 of the circumferential groove 72. It will be noted that the floating seal carrier 68 does not prevent the passage of primary hydraulic fluid between its exterior surface 86 and the interior surface 64 of the tubular structure 22. In fact, although the space therebetween shown in FIG. 1 is slightly exaggerated, it is desirable that the carrier be allowed, as its name implies, to float as it surrounds the rod 40. In other words, there is no need to provide critical manufacturing tolerances for the exterior surface 86 of the carrier 68 or the interior surface 64 of the tubular structure 22 or any critical matching of eccentricities therebetween. Instead, it is preferable for the floating carrier 68 to be provided sufficient clearance to be able to remain naturally aligned with and centered about the rod 40 for effective sealing about its exterior surface 66.

To prevent the passage of primary hydraulic fluid between the floating seal carrier 68 and the interior surface 64 of the tubular structure 22, a mechanical face seal 88 is provided. The mechanical face seal 88 is disposed between an inwardly extending carrier retainer ring 90 which is mounted at the end 30 of the tubular structure 22 toward the primary cylinder 28 and an end 92 of the floating seal carrier 68 adjacent to the primary cylinder 28. The mechanical face seal 88 preferably includes an expandable seal 94 which has a U-shaped cross section and includes a first lip 96 and a second lip 98 which extend generally inwardly toward the rod 40 to respectively make sealing contact with the retaining ring 90 and the end 92 of the floating seal carrier 68. Obviously, there are other types of mechanical face seals which could be utilized for this purpose, but it is significant to note that a seal of the type described is capable of effectively preventing the passage of primary hydraulic fluid between the floating seal carrier 68 and the interior surface 64 of the tubular structure 22 without the requirement of any critical manufacturing tolerances.

It can now be seen that the preferred floating seal carrier 68 and mechanical face seal 88 can be provided with less critical manufacturing tolerances than the seal carrier and O-ring configuration of the prior art actuator which is discussed above. It is also felt that the floating seal carrier 68 and use of lip seals will be more effective and less likely to wear with time and use.

For the preferred actuation means 18, the floating seal carrier 68 with a U-shaped expandable seal 76 and a mechanical face seal with an expandable seal 94 are particularly attractive because the interior 48 of the primary cylinder 28 will be periodically subjected to primary hydraulic fluid under pressure while the interior 54 of the tubular structure 22 will be exposed to the environment and atmospheric pressure. Because of the preferred service actuation means 20, the tubular structure 22 is not subjected to nor sealed to withstand service hydraulic fluid pressure and is therefore capable of being exposed to dirt and contamination from the environment. Specifically, grease, braking material, and dust could enter the interior 54 of the tubular structure 22 through the flexible seal 100 of the brake 10 which surrounds the stem 26. Additionally, because of the slot 62, a flexible sealing element 102 has a first end 104 which surrounds the slot 62 and a second end 106 which surround the hydraulic line 58 to restrict entrance of dirt and contamination into the interior 54 of the tubular structure 22. Nevertheless, there will be dirt and contamination within the interior 54 of the tubular structure 22 even though there would be a greater quantity were it not for the seal 100 and the flexible sealing element 102.

Since the rod 40 will periodically be axially moved within the interior of the carrier 68, there is some concern that dirt and contamination on the exterior surface 66 of the rod 40 would affect and interfere with the life and operation of the expandable seal 76. Accordingly, the floating seal carrier 68 is provided a wiper ring 108 adjacent the interior 54 of the tubular structure 22 for removing dirt and contamination from the exterior surface 66 of the rod 40. Although the wiper ring 108 is preferably installed in a circumferential groove 110 in the interior surface 74 of the floating seal carrier 68, there are any number of arrangements for providing such a wiper ring which could be alternatively employed.

Although there was no discussion hereinabove of sealing for the service actuation means of the prior art actuators described in the patents mentioned above, a similar concern for hydraulic sealing and dirt and contamination exists for the service piston 56 within the service cylinder 50. Specifically, the service piston 56 includes lip sealing means 112 which extend outwardly to make sealing contact with an interior surface 114 of the service cylinder 50. The service piston 56 preferably includes a circumferential groove 116 around an exterior surface 118 thereof. The preferred lip seal means 112 includes a U-shaped expandable seal 120 which is seated against an end wall 122 of the circumferential groove 116 remote from the interior 60 of the service cylinder 50. The expandable seal 120 has a first lip 124 making sliding, sealing contact with the interior surface 114 of the service cylinder 50 and a second lip 126 making sealing contact with a base 128 of the circumferential groove 116. Again, because the interior 54 of the tubular structure 22 is exposed to the environment, the service piston 56 is provided a wiper ring 130 remote from the interior 60 of the service cylinder 50 for removing dirt and contamination from the interior surface 114 of the service cylinder 50. Although the wiper ring 130 is installed in a circumferential groove 132 in the exterior surface 118 of the service piston 56, other configurations could be utilized for mounting and supporting one of any number of alternative types of wiper ring elements.

It should be clear that any number of alternatives could be made to the preferred embodiment of the invention without departing from the scope of the invention as claimed. For example, it may be possible to employ O-rings in a floating seal carrier if it is employed with a mechanical face seal to facilitate its alignment with the rod. On the other hand, if a lip seal is preferred, one could employ other types of lip seals rather than the preferred U-shaped, expandable seals and still reliably prevent the escape or loss of hydraulic fluid throughout the effective life of the actuator.

I claim:

1. A hydraulic brake actuator for a wedge type brake comprising:

a tubular structure extending from a housing of said brake to include an extended end of a stem of a wedge of said brake therein;

a primary cylinder mounted on said tubular structure;

a primary piston mounted for sealed movement within said primary cylinder and having rod means extending from a first side thereof into said tubular structure to be operably connected to said extended end of said stem;

biasing means acting on a second side of said primary piston and capable of moving said primary piston toward a first position within said primary cylinder for actuation of said brake;

piping means secured to said primary cylinder to be capable of being joined to a primary hydraulic control system for selective introduction of primary hydraulic fluid to said primary cylinder at said first side of said primary piston to cause movement thereof in opposition to said biasing means to a second position within said primary cylinder to prevent said actuation of said brake by said biasing means;

means for preventing a loss of said primary hydraulic fluid from said primary cylinder through an annular space between an interior surface of said tubular structure and an exterior surface of said rod means;

said means for preventing said loss of said primary hydraulic fluid including a floating seal carrier surrounding said rod means and supporting a sealing means extending inwardly to make sealing contact with said exterior surface of said rod means and means for preventing passage of said primary hydraulic fluid between said floating seal carrier and said interior surface of said tubular structure; and said means for preventing passage of said primary hydraulic fluid between said floating seal carrier and said interior surface of said tubular structure including a mechanical face seal disposed between an inwardly extending carrier retaining ring mounted at an end of said tubular structure toward said primary cylinder and an end of said floating seal carrier adjacent said primary cylinder.

2. The hydraulic brake actuator as set forth in claim 1, wherein said sealing means includes a lip seal.

3. The hydraulic brake actuator as set forth in claim 2, wherein said floating seal carrier includes a circumferential groove around an interior surface thereof, said lip seal includes a first U-shaped expandable seal seated against an end wall of said groove remote from said primary piston, and said expandable seal has a first lip making a sliding, sealing contact with said exterior surface of said rod means and a second lip making sealing contact with a base of said circumferential groove.

4. The hydraulic brake actuator as set forth in claim 1, wherein said tubular structure includes an interior thereof which is separated from said primary cylinder by said floating seal carrier, said rod means includes an end thereof remote from said primary piston and terminating within said interior of said tubular structure, said interior of said tubular structure is exposed to the environment, and said floating seal carrier includes a wiper ring surrounding said rod means and making wiping contact with said exterior surface thereof, said wiper ring being located between said sealing means and said interior of said tubular structure for removing dirt and contamination from said exterior surface of said rod means.

5. The hydraulic brake actuator as set forth in claim 1, wherein said mechanical face seal includes an expandable seal which has a U-shaped cross-section and includes a first lip and a second lip thereof extending generally inwardly toward said rod means to respectively make sealing contact with said carrier retaining ring and said end of said floating seal carrier.

6. The hydraulic brake actuator as set forth in claim 1, further including means mounted between an end of said rod means and said extended end of said stem for selectively varying a distance therebetween for corresponding selective actuation of said brake.

7. The hydraulic brake actuator as set forth in claim 6, wherein said means for selectively varying said distance includes a service cylinder mounted on one of said end of said rod means and said extended end of said stem, a service piston mounted on the other of said end of said rod means and said extended end of said stem, and means for selectively introducing service hydraulic fluid to and discharging said service hydraulic fluid from an interior of said service cylinder to act on said service piston to produce relative movement therebetween.

* * * * *